United States Patent
Ruf

[11] 3,882,201
[45] May 6, 1975

[54] THIOPHOSPHORIC ACID TRIESTERS
[75] Inventor: Erich Ruf, Essen, Germany
[73] Assignee: The Goldschmidt AG
[22] Filed: Mar. 21, 1973
[21] Appl. No.: 343,372

Related U.S. Application Data
[62] Division of Ser. No. 160,144, July 6, 1971, Pat. No. 3,770,853.

[30] Foreign Application Priority Data
July 9, 1970   Germany.............................. 2033987

[52] U.S. Cl. ................ 260/950; 260/951; 260/981
[51] Int. Cl. .............................................. C07f 9/16
[58] Field of Search............................ 260/950, 951

[56] References Cited
UNITED STATES PATENTS
2,565,921   8/1951   Hook et al...................... 260/950 X
3,760,042   9/1973   Beriger et al...................... 260/950

Primary Examiner—Lorraine A. Weinberger
Assistant Examiner—Richard L. Raymond
Attorney, Agent, or Firm—James E. Bryan

[57] ABSTRACT
This invention relates to a compound having the formula

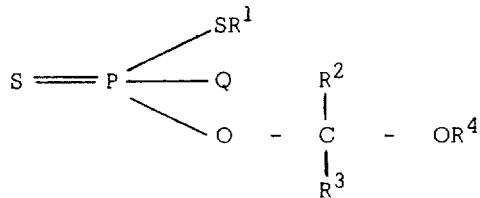

wherein Q is the group —$SR^1$ or

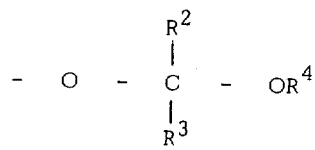

in which
$R^1$ and $R^4$ are selected from the group consisting of alkyl groups having about 1 to 12 carbon atoms, benzyl, and phenyl, and
$R^2$ and $R^3$ are selected from the group consisting of hydrogen, alkyl groups having about 1 to 12 carbon atoms, benzyl, and phenyl.

1 Claim, No Drawings

THIOPHOSPHORIC ACID TRIESTERS

This is a division of application Ser. No. 160,144, filed July 6, 1971, now U.S. Pat. No. 3,770,853.

This invention relates to a process for producing mixtures of dithiophosphoric acid triesters and triothiophosphoric acid triesters of the general formula:

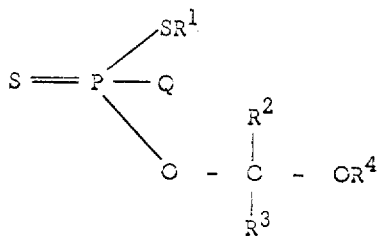

wherein Q is the group —SR$^1$ or

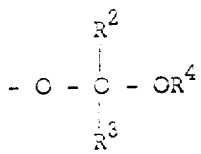

In the above formula, R$^1$ and R$^4$ are alkyl or aryl groups, and where R$^1$ and R$^4$ are alkyl, they may be, for example, methyl, ethyl, propyl, butyl, isobutyl, isooctyl or dodecyl groups. Where they are aryl groups, phenyl groups are preferred. The alkyl and aryl groups can be substituted, for example, by halogen atoms, in particular chlorine. The R$^1$ and R$^4$ groups also can be benzyl groups. The R$^1$ and R$^4$ groups can be the same or different within the same molecule.

R$^2$ is hydrogen or an alkyl, benzyl, or aryl group, which groups can be the same as for R$^1$ and R$^4$ as stated above.

R$^3$ is hydrogen or an alkyl, benzyl, or aryl group, and the groups may be substituted. The alkyl and aryl groups may be the same as those stated above for R$^1$ and R$^4$.

For the production of thiophosphoric acid triesters containing oxygen and sulfur several methods are known:

For example, thiophosphoric acid-0,0,0-trialkyl esters can be produced by linking sulfur to phosphoric acid trialkyl esters:

$$(RO)_3 P + S = (RO)_3 P \rightarrow S$$

Thiophosphoric acid-0,0,0-tris-halogenalkylesters also can be produced by reacting thiophosphoric acid halides with epoxyalkane compounds, if necessary in the presence of catalysts such as tertiary amines.

It also is known to convert phosphorus pentasulfide with aliphatic alcohols (multiple molar quantities) to dithiophosphoric acid-0,0 dialkyl esters:

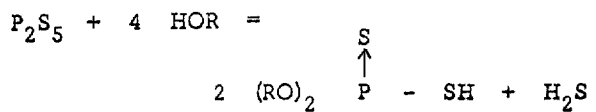

These dithiophosphoric acid-0,0-dialkyl esters can be converted into the corresponding dithiophosphoric acid-0,0-dialkyl-S-alkyl esters by esterifying them with higher boiling alcohols at an elevated temperature or, better still, in the presence of acid catalysts, for example concentrated sulfuric acid, at lower temperatures.

Furthermore, the salts, for example the lead salts, of dithiophosphoric acid-0,0-diesters with alkylhalides can be converted into dithiophosphoric acid-0,0-S-trialkyl esters.

It also is known to convert phosphorusoxyhalides with mercaptans or mercaptides into the corresponding trithiophosphoric acid-S,S,S,-trialkyl esters.

It is furthermore known that phosphorus pentasulfide reacts with orthoalkyl esters of formic acid at temperatures of 100° to 150° C. with the formation of trialkyl esters of dithiophosphoric acid according to the following equation:

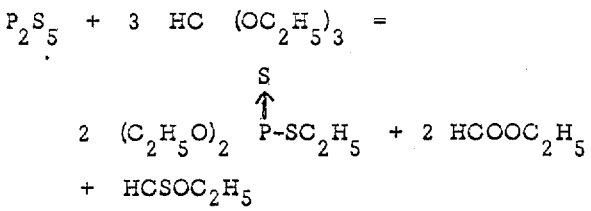

In all of these known methods for producing phosphoric acid triesters containing oxygen and sulfur, expensive starting compounds are required or unsatisfactory yields are obtained in the individual reactions.

Finally, in the conversions of phosphorusoxyhalides or thiophosphoric acid halide compounds with mercaptans or mercaptides or alcohols, it must be ensured that hydrogen halide is separated, otherwise corresponding halide salts are formed with the use of mercaptides.

In accordance with the present invention it has been found that phosphoric acid triester compounds can be produced by the reaction of phosphorus pentasulfide with acetals in a simple manner.

According to the present invention phosphorus pentasulfide is reacted with compounds of the general formula I:

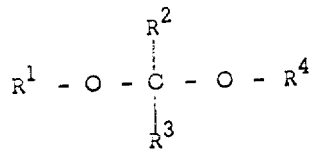

wherein the substituents R$^1$, R$^2$, R$^3$, and R$^4$ have the same meaning as given above. The reaction is effected in the presence of solvents, if necessary, in a molar ratio of 1 : ≧ 3.

It is assumed that the process according to the present invention for the production of phosphoric acid triester compounds by reacting phosphorus pentasulfide with acetals is based on the following reaction equation:

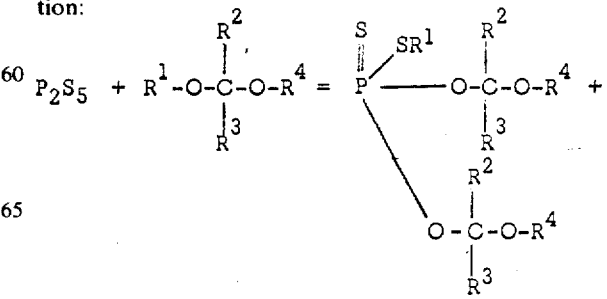

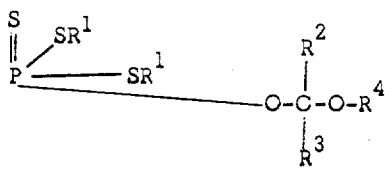

In this process there are obtained mixtures of dithiophosphoric acid triester compounds and trithiophosphoric acid triester compounds.

The reaction of phosphorus pentasulfide with acetals is preferably effected at a temperature in the range of about 80° to 120° C., especially between 80° and 100° C.

With the addition of low-molecular weight formaldehyde-dialkylacetal compounds, for example formaldehyde-dimethylacetal, the reaction is exothermic.

In the absence of solvents, the reaction is preferably effected by stirring phosphorus pentasulfide in an acetal compound heated to about 40° to 60° C. and, after the addition of all of the acetal compound, the mixture is heated at a temperature in the range of about 80° to 110° C. for about 2 to 5 hours.

When a solvent is employed, the phosphorus pentasulfide preferably is stirred in the inert solvent, the mixture is heated to a temperature in the range of about 40° to 60° C. and then the acetal is gradually added. The reaction mixture is then heated to the desired reaction temperature while stirring.

When dialkyl or diaryl acetal compounds are used, then the molar ratio of the reactants to be added according to the foregoing reaction equation is preferably 1 phosphorus pentasulfide to 3 acetal.

An excess of acetal compound with respect to this molar ratio acts in the manner of an inert solvent. It should be taken into account in this case that with relatively low-boiling acetal compounds, such as formaldehyde-dimethylacetal, an excess results in longer reaction times since optimum reaction temperatures are not attained due to the reflux of the low-boiling acetal compound.

With the use of an excess of dialkyl or diaryl acetal compound, with respect to the previously mentioned reaction equation, it is possible after the completion of the reaction to completely distill off the excess acetal compound so that similar reaction products to those produced in a stoichiometric reaction, i.e., phosphorus pentasulfide/acetal compound in a 1 : 3 molar ratio, are obtained. Mixed acetal compounds or mixtures of various acetal compounds also can be used in the reaction of phosphorus pentasulfide with acetal compounds.

In principle, the reaction also can be carried out by adding acetal compounds to the phosphorus pentasulfide.

Due to the very pronounced reaction in this procedure, i.e. with the use of low-boiling acetals such as formaldehyde-dimethylacetal, it is desirable to use inert solvents such as toluene, xylene, and the like, since otherwise explosions can occur.

With the use of formaldehyde-acetal compounds in such reactions small quantities of thioformaldehyde, i.e., about 5%, are obtained. With greater heating, i.e., above 120° C., of the phosphoric acid triester compounds containing oxygen and sulfur which are produced according to the method of the invention, there occurs a relatively rapid decomposition of the phosphoric acid triester compounds containing oxygen and sulfur. This decomposition can be very intense, depending upon the reaction mixture of such oxygen and sulfur containing phosphoric acid triester compounds.

Depending upon the acetal compound employed, yields between 92 and 100% are obtained in the present method for the production of oxygen and sulfur containing compounds by reaction of phosphorus pentasulfide with acetals.

The phosphoric acid triester compounds containing oxygen and sulfur which are obtained according to the method of the invention can be used in pest control, with the compounds obtained having, in part, good acaricidal action, i.e., for destruction of mites and ticks, good fungicidal action, i.e., effectiveness against grasshoppers and the common house fly, and also good nematocidal action.

The invention will be further illustrated by reference to the following specific examples.

EXAMPLE 1

Into a 1-liter four-necked flask equipped with a stirrer, a reflux condenser, a thermometer and a dropping funnel is placed a suspension of 111 grams of phosphorus pentasulfide $P_2S_5$ in 300 ml of toluene and the suspension is heated to a temperature in the range of 40° to 60° C. To this $P_2S_5$ suspension is gradually added 114 grams of formaldehyde-dimethylacetal, while stirring, over a period of 1 to 2 hours. The reaction mixture then is heated to a temperature between 90° to 95° C. for about 2 to 3 hours. The end of the reaction is recognized by the practically complete conversion of $P_2S_5$, i.e., a practically clear solution is obtained.

At the end of the reaction, incompletely reacted phosphorus pentasulfide and a small quantity of impurities are filtered out of the solution and the toluene is removed by distilling under vacuum.

There is obtained an equimolar mixture of dithiophosphoric acid-0-methoxymethyl-0-methoxymethyl-S-methyl-triester and trithiophosphoric acid-0-methoxymethyl-S-methyl-S-methyl-triester, in a 96% yield.

At the same time about 1.5 grams of thioformaldehyde are obtained.

EXAMPLE 2

Into a 250 ml four-necked flask equipped with a stirrer, a thermometer and a reflux condenser are placed 100 grams of formaldehyde-di-n-butylacetal. The acetal is then heated to about 60° C. and gradually mixed, by stirring, with 28 grams of phosphorus pentasulfide over a period of about one-half hour. The reaction mixture is then heated, while stirring, to about 100° C. for a period of about 2 hours. After the reaction is completed, the excess formaldehyde-di-n-butylacetal is removed by distilling under vacuum; 40 grams of formaldehyde-di-n-butylacetal are distilled off.

After removal of the excess formaldehyde-di-n-butylacetal, there is obtained, in a 99% yield, an equimolar mixture of dithiophosphoric acid-0-butoxymethyl-0-butoxymethyl-S-methyl-triester and trithiophosphoric acid-0-butoxymethyl-S-methyl-S-methyl-triester.

EXAMPLE 3

Following the procedure of Example 2, 120 grams of formaldehyde-bis-chloroethylacetal and 52 grams of phosphorus pentasulfide are reacted for about 1 to 2 hours at a temperature of about 120° C. At the end of the reaction, there is obtained, in a 99% yield, an equimolar mixture of dithiophosphoric acid-0-chlorethoxymethyl-0-chlorethoxymethyl-S-chlorethyl-triester and trithiophosphoric acid-chlorethoxymethyl-S-chlorethyl-S-chlorethyl-triester.

EXAMPLE 4

Following the procedure of Example 2, 70 grams of dichloracetaldehydediethyl-acetal are reacted with 28 grams of phosphorus pentasulfide for about 4 hours at a temperature in the range of about 110° to 120° C. There is obtained, in a 97% yield, an equimolar mixture of dithiophosphoric acid-0-ethoxy-dichlorethyl-0-ethoxy-dichlorethyl-S-ethyl-triester and trithiophosphoric acid-0-ethoxy-dichlorethyl-S-ethyl-S-ethyl-triester.

EXAMPLE 5

Following the procedure of Example 2, 23 grams of benzaldehydedimethylacetal are reacted with 11.1 grams of phosphorus pentasulfide for about 2 to 3 hours at a temperature of 110° C. There is obtained an about 99% yield of an equimolar mixture of dithiophosphoric acid-0-methoxybenzyl-0-methoxybenzyl-S-methyl-triester and trithiophosphoric acid-0-methoxybenzyl-S-methyl-S-methyl-triester.

EXAMPLE 6

Into a 250 ml four-necked flask equipped with a stirrer, a reflux condenser, a thermometer and a dropping funnel there are suspended, by stirring, 55.5 grams of $P_2S_5$ in 100 ml of toluene. The suspension is heated to a temperature in the range of about 40° to 60° C.

A mixture of 28.5 grams of formaldehyde-dimethylacetal and 49.5 grams of formaldehyde-diisopropylacetal is gradually added, while stirring, to this $P_2S_5$ suspension. The reaction mixture is then heated for about 8 hours at a temperature in the range of about 80° to 90° C. At the end of the reaction, a clear solution is obtained and the toluene is removed by distillation under vacuum (about 50° C./15 mm).

There is obtained, in an about 97% yield, a mixture of dithiophosphoric acid-0-methoxymethyl-0-methoxymethyl-S-methyl-triester or dithiophosphoric acid-0-isopropoxymethyl-0-isopropoxymethyl-S-isopropyl-triester and trithiophosphoric acid-0-methoxymethyl-S-methyl-S-methyl-triester or trithiophosphoric acid-0-isopropoxymethyl-S-isopropyl-S-isopropyl-triester.

EXAMPLE 7

Following the procedure of Example 2, 69 grams of formaldehyde-dodecylmethyl-acetal are reacted with 22.2 grams of $P_2S_5$ at a temperature of about 90° to 100° C. for about 6 hours. There is obtained, in an about 99% yield, a mixture of dithiophosphoric acid-0-dodecyloxymethyl-0-methoxymethyl-S-methyl-triester and trithiophosphoric acid-0-dodecyloxymethyl-S-dodecyl-S-methyl-triester.

EXAMPLE 8

In a 250 ml four-necked flask similar to that employed in Example 1, 28 grams of $P_2S_5$ in 100 ml of toluene are reacted with 85.5 grams of formaldehyde-dibenzyl-acetal for about three hours at a temperature in the range of 90° to 100° C. After the complete dissolution of the $P_2S_5$ employed there are obtained, in addition to a small quantity of decomposition products, an about 92% yield of a mixture of dithiophosphoric acid-0-benzyloxymethyl-0-benzyloxy-methyl-S-benzyl-triester and trithiophosphoric acid-0-benzyloxymethyl-S-benzyl-S-benzyl-triester.

EXAMPLE 9

Following the procedure of Example 2, 81 grams of p-nitrobenzaldehyde-dimethyl-acetal are reacted with 30 grams of $P_2S_5$ for about 4 hours at a temperature of about 80° to 90° C. There is obtained, in an about 99% yield, a mixture of dithiophosphoric acid-0-methoxy-p-nitrobenzyl-0-methoxy-p-nitrobenzyl-S-methyl-triester and trithiophosphoric acid-0-methoxy-p-nitrobenzyl-S-methyl-S-methyl-triester.

EXAMPLE 10

Following the procedure of Example 2, 78.2 grams of acetone-dimethylacetal are reacted with 55.5 grams of $P_2S_5$ for about 2 hours at a temperature of about 60° to 70° C. There is obtained, in an about a 99% yield, a mixture of dithiophosphoric acid-0-methoxyisopropyl-0-methoxyisopropyl-S-methyl-triester and trithiophosphoric acid-0-methoxyisopropyl-S-methyl-S-methyl-triester.

EXAMPLE 11

Into a 250 ml four-necked flask equipped with a stirrer, a reflux condenser and a thermometer there are suspended, by stirring, 15.6 grams of $P_2S_5$ in 60 ml of toluene and 48 grams of benzophenone-dimethylacetal and the mixture is then heated for about 2 hours to a temperature in the range of about 80° to 90° C. At the completion of the reaction, the clear solution formed is decanted from the small residue and from the accumulated decomposition products. The toluene is removed by distilling under vacuum (about 50° C./15 mm). There is obtained, in an about 96% yield, a mixture of dithiophosphoric acid-0-methoxy-diphenylmethyl-0-methoxy-diphenylmethyl-S-methyl-triester and trithiophosphoric acid-0-methoxy-diphenylmethyl-S-methyl-S-methyl-triester.

It will be obvious to those skilled in the art that many modifications may be made within the scope of the present invention without departing from the spirit thereof, and the invention includes all such modifications.

What is claimed is:

1. A compound having the formula

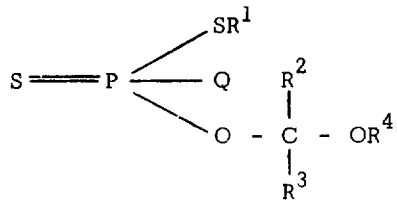

wherein Q is the group —$SR^1$ or

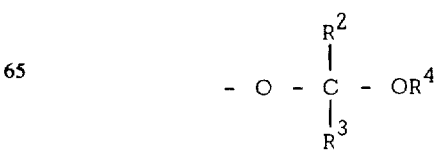

in which
R¹ and R⁴ are selected from the group consisting of alkyl and chloroalkyl groups having about 1 to 12 carbon atoms, benzyl, phenyl, and chlorophenyl, and R² and R³ are selected from the group consisting of hydrogen, alkyl and chloroalkyl groups having about 1 to 12 carbon atoms, benzyl, phenyl, and chlorophenyl.

* * * * *